US008332534B2

(12) United States Patent
Izoslav et al.

(10) Patent No.: US 8,332,534 B2
(45) Date of Patent: Dec. 11, 2012

(54) TECHNIQUES TO IMPROVE MULTIPLE COLLOCATED DEVICE NETWORKING OVER SINGLE WIRELESS COMMUNICATION NETWORKS

(75) Inventors: Tchigevsky Izoslav, Kiryat Haim (IL); Oren Kaidar, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 11/495,960

(22) Filed: Jul. 28, 2006

(65) Prior Publication Data

US 2008/0028089 A1   Jan. 31, 2008

(51) Int. Cl.
*G06F 15/173* (2006.01)

(52) U.S. Cl. ........................................ 709/238
(58) Field of Classification Search .................. 709/238; 718/1; 703/21

See application file for complete search history.

(56) References Cited

U.S. PATENT DOCUMENTS

| | | | |
|---|---|---|---|
| 6,950,628 B1 | 9/2005 | Meier | |
| 7,440,415 B2* | 10/2008 | Wild et al. | 370/254 |
| 2002/0085506 A1* | 7/2002 | Hundscheidt et al. | 370/254 |
| 2002/0093929 A1* | 7/2002 | Mangold et al. | 370/336 |
| 2003/0063593 A1 | 4/2003 | Koyanagi et al. | |
| 2003/0120763 A1 | 6/2003 | Volpano | |
| 2003/0227934 A1* | 12/2003 | White et al. | 370/432 |
| 2003/0236082 A1* | 12/2003 | Aoki et al. | 455/278.1 |
| 2003/0236089 A1* | 12/2003 | Beyme et al. | 455/423 |
| 2004/0001492 A1* | 1/2004 | Johnson | 370/395.32 |
| 2006/0013159 A2* | 1/2006 | Gurevich | 370/328 |
| 2006/0072584 A1 | 4/2006 | Goto et al. | |

FOREIGN PATENT DOCUMENTS

| | | | |
|---|---|---|---|
| EP | 1617574 A1 * | 1/2006 |
| JP | 2003-110567 | 4/2003 |
| JP | 2004-040671 | 2/2004 |
| JP | 2004-289328 | 10/2004 |
| JP | 2006-101037 | 4/2006 |
| JP | 2006-165982 | 6/2006 |

OTHER PUBLICATIONS

AGP: a self-adaptive MAC protocol for broadcast LANs with bursty traffic, Papadimitriou, G.I.; Consumer COmmunications and Networking Conference, 2004. CCNC 2004. First IEEE, Jan. 5-8, 2004 pp. 285-288.

International Search Report and Written Opinion of the International Searching Authority; Dated Nov. 22, 2007; PCT/US2007/073636, 11 pgs.

International Report on Patentability of the International Searching Authority; Dated Feb. 12, 2009: PCT/US2007/073636, 7 pgs.

* cited by examiner

*Primary Examiner* — Ryan Jakovac

(74) *Attorney, Agent, or Firm* — Blakely, Sokoloff, Taylor & Zafman (57) ABSTRACT

An embodiment of the present invention provides an apparatus, comprising a wireless station (STA) capable of communicating with an access point (AP), wherein the STA is capable of representing itself to the AP as a Group-of-Stations. The Group-of-Stations may be a plurality of networking devices (such as virtual stations) in an embodiment of the present invention and the Group-of-Stations may be defined by adding an Information Element (IE) to an Association/Reassociation request; or the Group of Stations may be defined by using masking operations on a MAC address.

24 Claims, 5 Drawing Sheets

TECHNIQUES TO IMPROVE MULTIPLE COLLOCATED DEVICE NETWORKING OVER SINGLE WIRELESS COMMUNICATION NETWORKS

BACKGROUND

Modern computing platforms (like Personal Computers) may include support for multiple networking devices connecting to the network by single wireless card. Those networking devices may be a physical devices (for example main platform CPU running generic purpose applications and auxiliary embedded CPU that may run specific applications such as internet phone or manageabily). Those devices may be also virtual networking devices, such us Virtual Machines sharing single or multiple CPU-s with help of Virtualization Technology (VT) that may provide hardware support for running multiple Virtual Machines on the same computer.

One of the aspects of such multiple networking devices collocated in single computer is how they are presented on a network.

For corporate networks it may be desirable that each networking device be able to communicate with the networking infrastructure on a Media Access Control (MAC) layer (also known as L2). This allows the corporate network administrators to enforce certain security and traffic priority policies for different computers and users of these computers.

Current solutions are designed primarily for wired networks and suppose emulating a separate Network Card with its own MAC address for each Networking Machine for each networking device. In addition, such platform implements software or hardware emulation of appropriate network junction devices, such as a HUB, switch, bridge or gateway. From a network infrastructure perspective, it seems that network is connected to this Junction device, which is connected directly to each one of Networking Devices.

Although the present invention is not limited to any specific standards, for the Institute for Electronics and Electrical Engineers (IEEE) 802.11 standard networks, such a solution has a different network topology, where 802.11 Stations are connected to 802.11 Access Points. Currently, Access Points do not expect that there will be more than one computer behind the wireless link established by a station (or that there will be more than one MAC address that will be redirected by the AP to the station). The problem with such configuration is that since all Networking Devices share the same radio hardware, they may connect to the same AP.

Thus, a strong need exists for techniques to improve communication of multiple collocated networking devices over single wireless connection.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An algorithm, technique or process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software. as in a cause and effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like), wireless wide are networks (WWAN), wireless metropolitan area networks (WMAN) and Mesh networks.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause and effect relationship).

Figure 1:
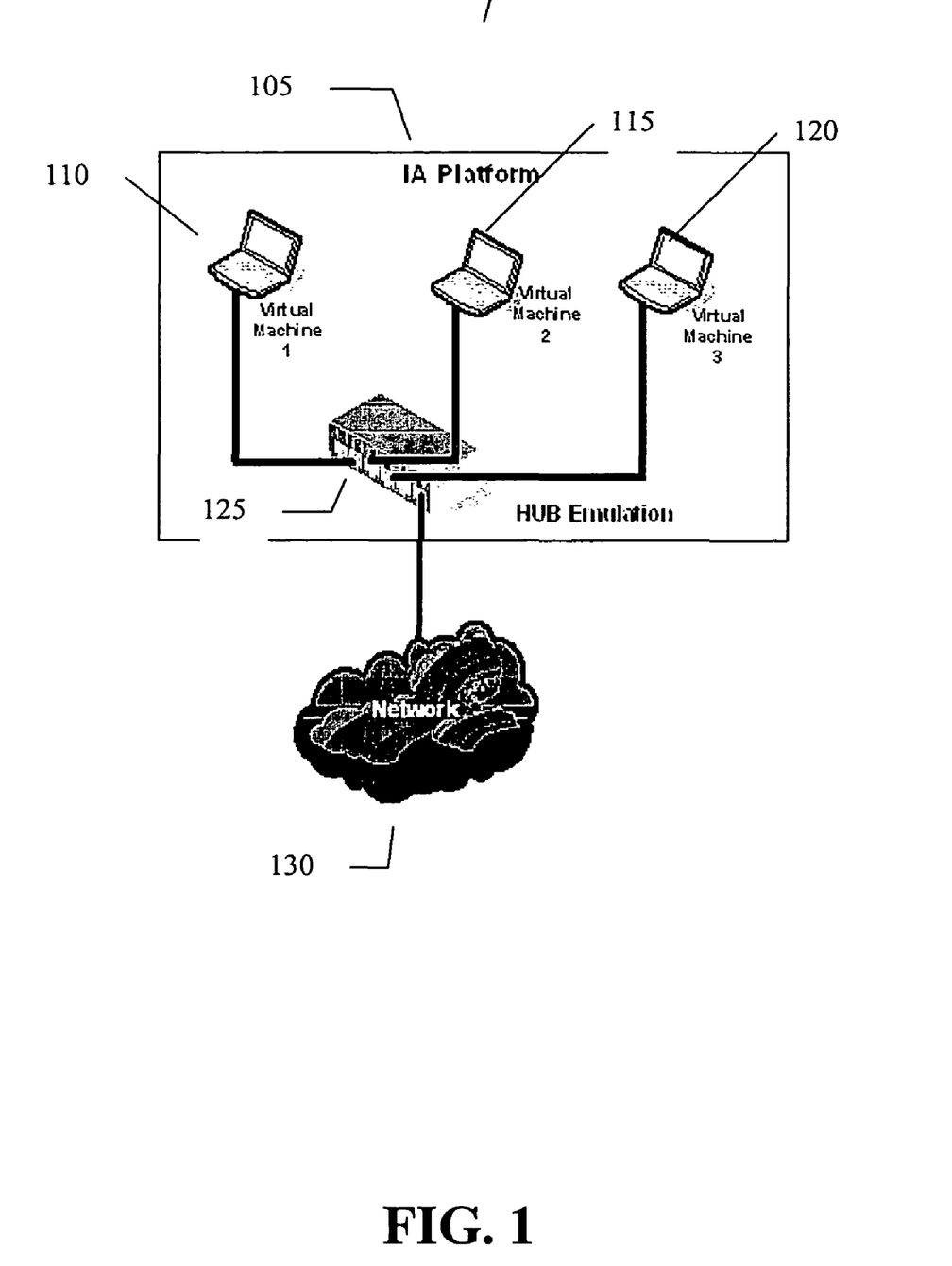
FIG. 1 is an illustration of a wired VT networking architecture.

Although the present invention is not limited to the VT embodiment and the VT embodiment is but one illustrative embodiment, turning now to the figures, FIG. 1 shown generally as 100, is an illustration of a wired VT networking architecture. In the wired networking architecture, a platform may include virtual machine 1 (110), virtual machine 2 (115) and virtual machine 3 (120) connected to a HUB emulation 125 connected to network 130.

Figure 2:
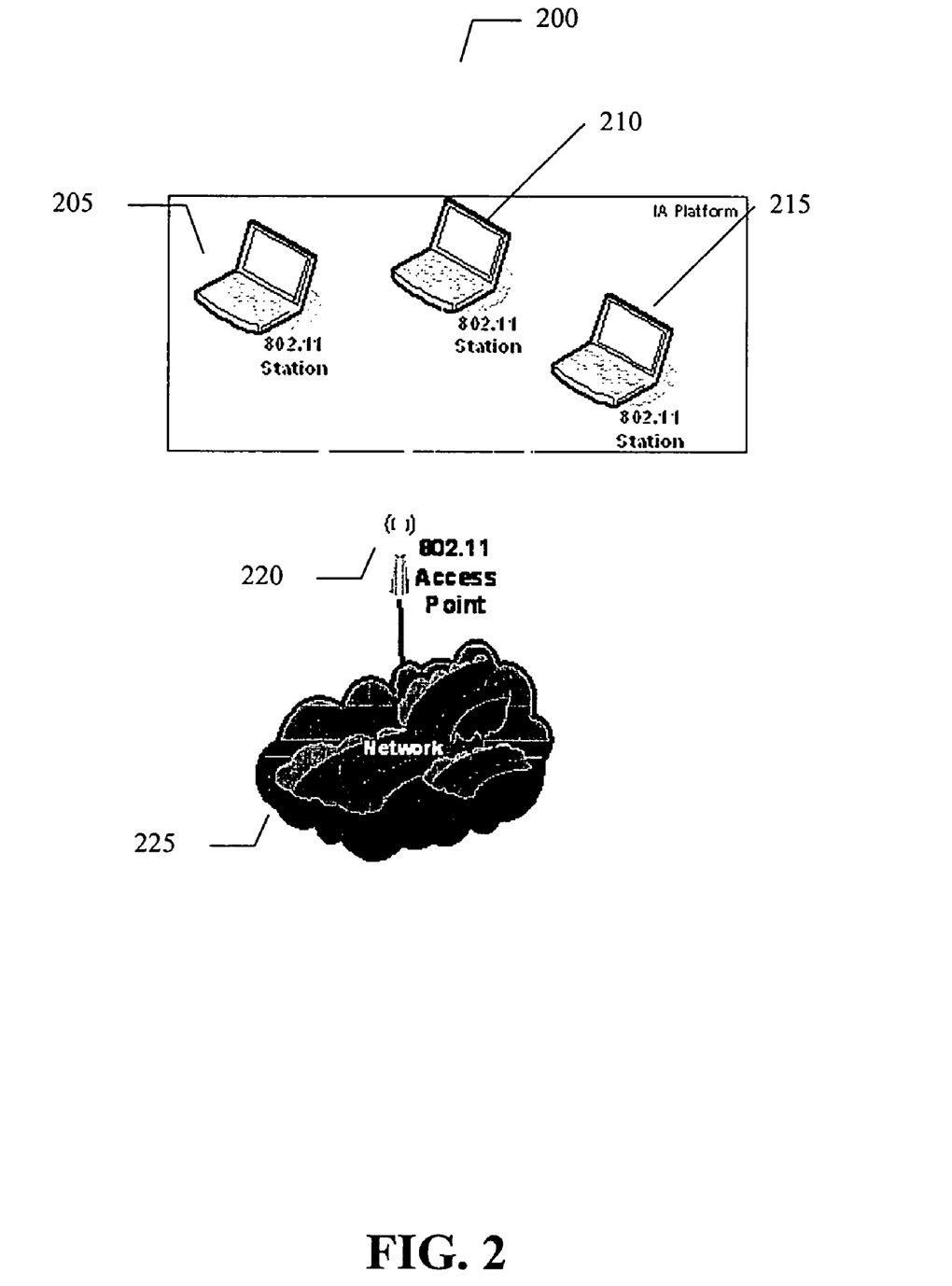
FIG. 2 illustrates a regular 802.11 network topology.

FIG. 2 illustrates a regular 802.11 network topology with platform 200 including 802.11 station 205, 802.11 station 210 and 802.11 station 215 all wirelessly connected to 802.11 access point (AP) 220. AP 220 provides access to network 225.

Figure 3:
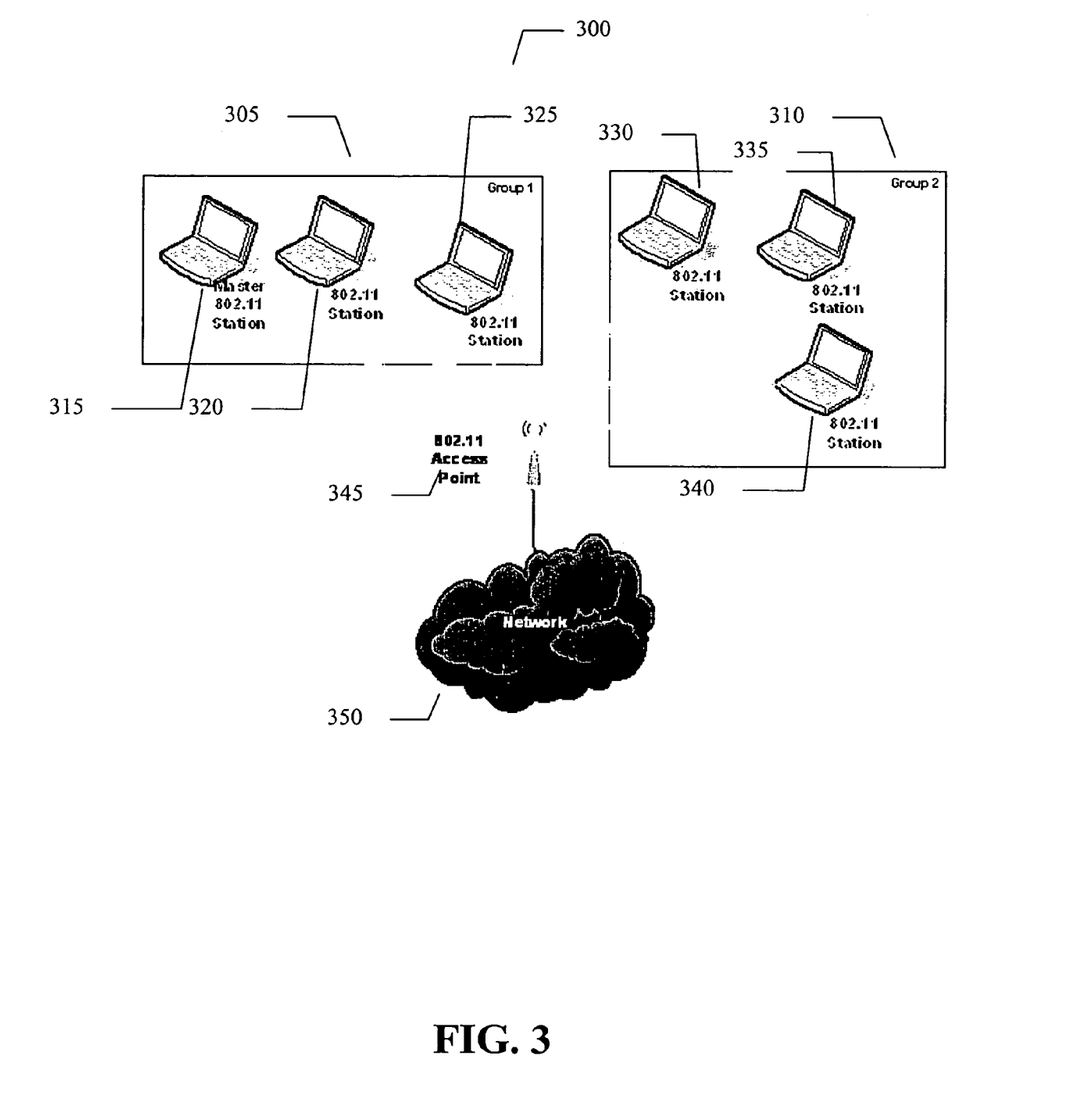
FIG. 3 illustrates an 802.11 network topology with a Group-of-Stations according to one embodiment of the present invention.

Turning now to FIG. 3, shown generally as 300, is an embodiment of the present invention which provides the connecting of multiple networking devices (such as Virtual Machines (315-340)) running on the same platform to an 802.11 wireless network using multiple L2 (Media Access Control Layer) links, while minimizing network overhead caused by it. Again, it is understood that the present invention is not limited to a particular wireless communication standard. Access point 345 may see several stations connected to it while it actually may only be communicating with a single one. If access point 345 was aware that those multiple stations (315, 320, 235 in group 1 305; 330, 335 and 340 in group 2 310) connected to it are actually the same computer, it would be able to optimize both air link handling and internal resources allocation.

Thus, in an embodiment of the present invention as shown generally as 300 in FIG. 3, an 802.11 protocol may be enhanced with capabilities that include a Group-of-stations paradigm (two groups, 305 and 310 in the embodiment of FIG. 3). When connecting to access point 345, each station 315-340 may declare that it belongs to the Group-of-stations (group 1 305 or group 2 310). After that, when receiving specific 802.11 management frames from specific stations, access point 345 may use it as if it was received from each station of Group-of-Stations 305 and 310. Also, when access point 345 sends management frames to one of the stations 315-340 in the Group-of-Stations 305 and 310, it assumes that it was sent to all stations 315-340 in the group. One station in the group may be defined as a "master station" and may coordinate certain 802.11 operations on behalf of the entire group.

In an embodiment of the present invention, the Group-of-Stations may be used for presenting networking devices such as Virtual Machines 315-340 of the same platform on a network 350. In this illustration in FIG. 3, Group-of-Stations may represent a computer platform and each station in the group may represent the connection of a specific Virtual Machine "Group-of-stations" may be defined by adding an Information Element to an Association/Reassociation request. The Information Element may contain ID that uniquely identifies the Group-of-Stations. Also this Information Element may describe which 802.11 operations (power save, air-time allocation, disconnection, etc. . . . ) may be managed by this station on behalf of entire group.

Figure 4:
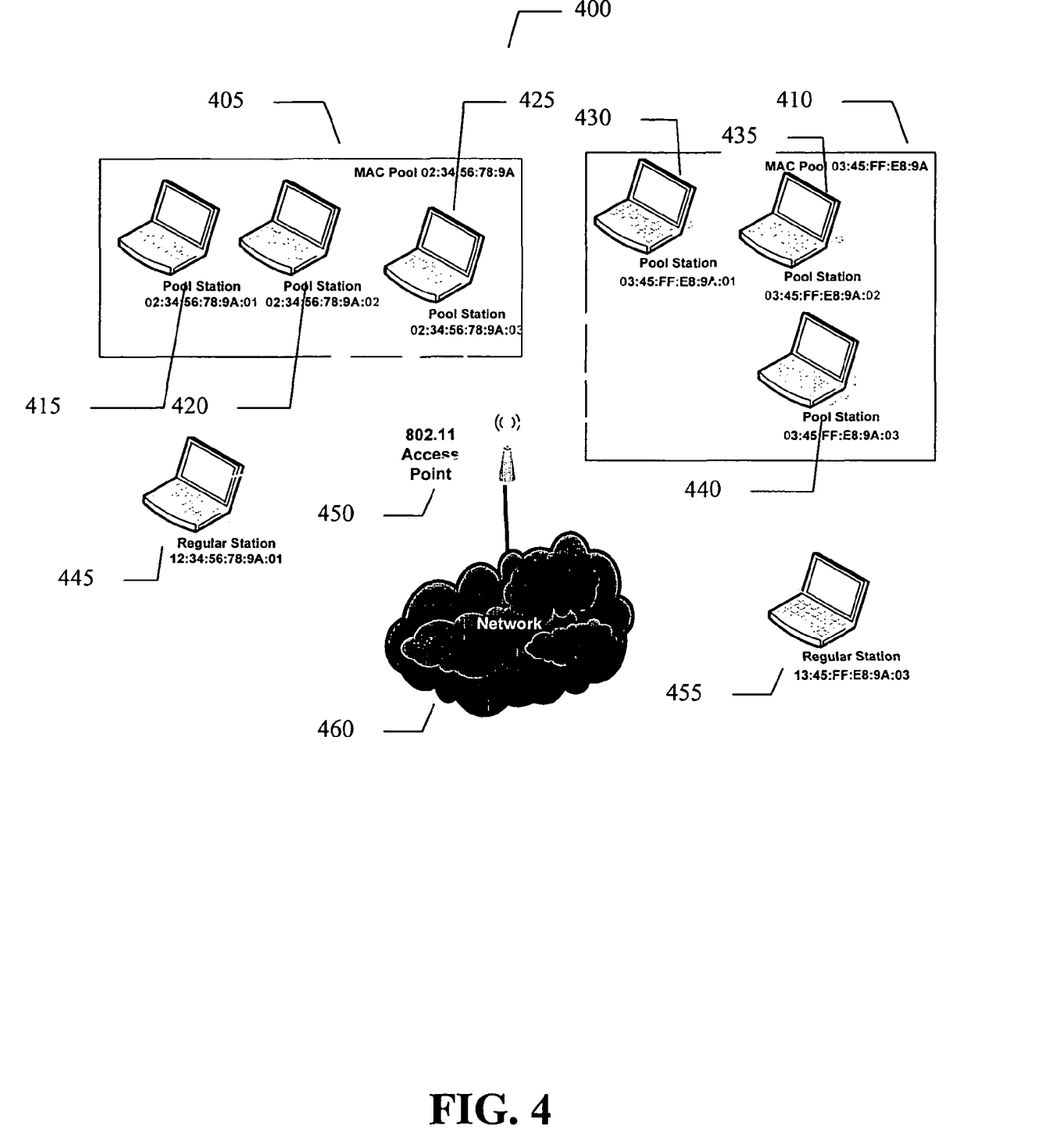
FIG. 4 illustrates an 802.11 network topology with a Group-of-Stations using a MAC address mask according to one embodiment of the present invention.

Turning now to FIG. 4, as generally shown at 400, is another possible solution for defining Group-of-stations which includes using masking operations on MAC addresses, which may include:

- The N bits (40 most significant bits in example shown at FIG. 4) of stations 415-440 MAC addresses may identify the Group-of-Stations (group 1 405 or group 2 410) address;
- To differentiate between Group-of-Stations 405 and 410 addresses and regular MAC addresses, M bits (4 most significant bits in the example of FIG. 4) of Group-of-Stations addresses may be set to a specific mask (0000b in FIG. 4, for example);
- X bits (equal to 48−N) of a MAC address in specific places (8 less significant bits in example) of a station MAC address uniquely identifies a station (one or more of stations 415-440) inside of Group-of-Stations 405 and 410.

Access point 450 may also be in communication with non-grouped stations 445 and 455 and provide access to network 460.

Figure 5:
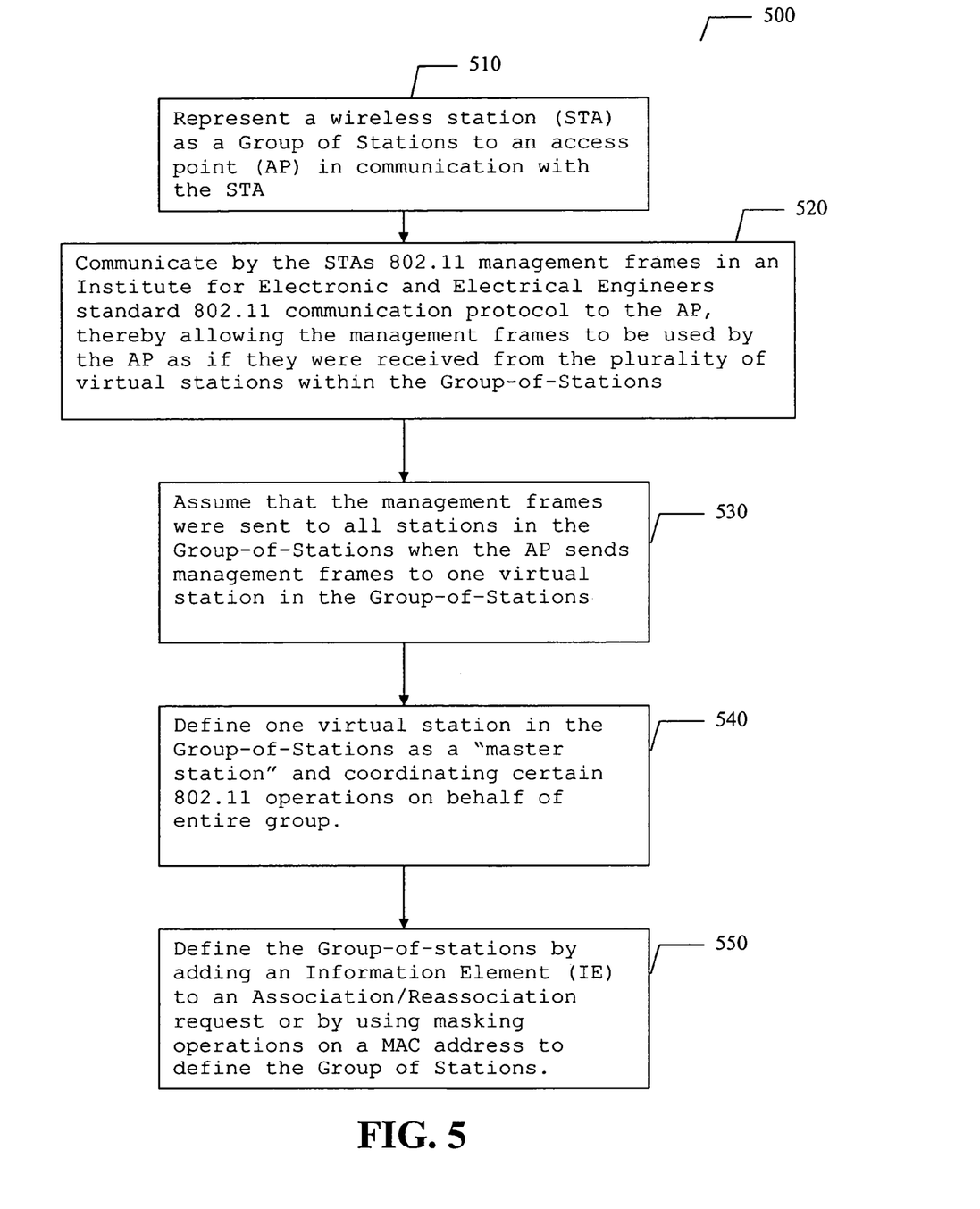
FIG. 5 illustrates a method of one embodiment of the present invention.

As illustrated at 500 in FIG. 5, an embodiment of the present invention further provides a method, comprising representing a wireless station (STA) as a Group of Stations to an Access Point (AP) in communication with the STA 510. The group of stations may be a plurality of networking devices such as virtual stations and the method may further comprising communicating by the STA 802.11 management frames in an Institute for Electronic and Electrical Engineers standard 802.11 communication protocol to the AP 520, thereby allowing the management frames to be used by the AP as if they were received from the plurality of virtual stations within the Group-of-Stations. Also, the present method may comprise assuming that the management frames were sent to all stations in the group Group-of-Stations when the AP sends management frames to one virtual station in the Group-of-Stations 530 and defining one networking device in the Group-of-Stations as a "master station" and coordinating certain 802.11 operations on behalf of entire group 540.

The present method in one embodiment of the present invention may include defining the Group-of-stations by adding an Information Element (IE) to an Association/Reassociation request 550, which may provide that the IE contains ID that uniquely identifies the group-of-stations and describe which operations can be managed by the STA on behalf of entire group. In an alternate embodiment an embodiment of the present invention may comprise using masking operations on a MAC address 550 to define the Group of Stations.

Yet another embodiment of the present invention provides a machine-accessible medium that provides instructions, which when accessed, cause a machine to perform operations comprising representing a wireless station (STA) as a Group of Stations to an access point (AP) in communication with the STA. The present machine-accessible medium of this embodiment may further comprise the instructions causing the machine to perform operations further comprising communicating by the STA 802.11 management frames in an Institute for Electronic and Electrical Engineers standard 802.11 communication protocol to the AP, thereby allowing the management frames to be used by the AP as if they were received from the plurality of virtual stations within the Group-of-Stations.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
a wireless station (STA) configured as a Group-of-Stations comprising a plurality of virtual stations on a computer platform, wherein said STA is capable of communicating with an access point (AP) in a managed wireless network, wherein said STA is capable of sending first management frames to said AP, wherein said first management frames are sent by said STA as being from said the plurality of virtual stations, and wherein said AP is configured to communicate with one of the plurality of virtual stations in said Group-of-Stations while sending second management frames to the plurality of virtual stations in said group Group-of-Stations, wherein said Group-of-Stations is configured by using masking operations on a MAC address, wherein said using masking operations on a MAC address comprises N bits of a station MAC address to identify the Group-of-Station's address, and to differentiate between Group-of-Station's addresses and regular MAC addresses, M bits of Group-of-Station's addresses that are set to a specific mask; and X bits of a MAC address that are in a specific place of a station MAC address to uniquely identify a particular station inside a Group-of-Stations.

2. The apparatus of claim 1, wherein said first management frames are in compliance with an Institute for Electronic and Electrical Engineers standard 802.11 communication protocol, and wherein said first management frames are used by said AP as if they were received from said plurality of virtual stations within said Group-of-Stations.

3. The apparatus of claim 1, wherein one of the plurality of virtual stations is defined as a "master station" and coordinates certain 802.11 operations on behalf of the plurality of virtual stations.

4. The apparatus of claim 1, wherein said Group-of-stations is configured by adding an Information Element (IE) to an Association/Reassociation request.

5. The apparatus of claim 4, wherein said IE contains identification that uniquely identifies the Group-of-Stations.

6. The apparatus of claim 4, wherein said IE contains data describing which operations can be managed by this station on behalf of entire group.

7. The apparatus of claim 1, wherein said Group-of-Stations is used for presenting virtual machines of the same platform on a network.

8. The apparatus of claim 7, wherein the Group-of-Stations represents the computer platform and each station in the plurality of virtual stations represents a connection of a specific virtual machine.

9. A method, comprising:
representing, by an apparatus, a wireless station (STA) as a Group-of-Stations to communicate with an access point (AP) in a managed wireless network, wherein said Group-of-Stations comprises a plurality of virtual stations;
sending by said AP first management frames to the plurality of virtual stations in said Group-of-Stations while communicating with one of the plurality of virtual stations in said Group-of-Stations: and
using masking operations on a MAC address to define said Group of Stations, wherein said using masking operations on a MAC address comprises identifying the Group-of-Station's address by using N bits of a station MAC address and differentiating between Group-of-Station's addresses and regular MAC addresses by using M bits of Group-of-Station's addresses set to a specific mask; and using X bits of a MAC address that are in a specific place of a station MAC address to uniquely identify a particular station inside said Group-of-Stations.

10. The method of claim 9, further comprising communicating by said STA second management frames in compliance with an Institute for Electronic and Electrical Engineers standard 802.11 communication protocol to said AP, wherein said second management frames are used by said AP as if they are received from said plurality of virtual stations within said Group-of-Stations.

11. The method of claim 9, further comprising defining one virtual station in said Group-of-Stations as a "master station" and coordinating certain 802.11 operations on behalf of entire group.

12. The method of claim 9, further comprising defining said Group-of-stations by adding an Information Element (IE) to an Association/Reassociation request.

13. The method of claim 12, wherein said IE contains identification that uniquely identifies the group-of-stations.

14. The method of claim 12, wherein said IE contains data describing which operations can be managed by said STA on behalf of entire group.

15. The method of claim 9, further comprising using said Group-of-Stations for presenting virtual machines of the same platform on a network.

16. The method of claim 15, further comprising representing a computer platform by said Group-of-Stations and wherein each station of the plurality of virtual stations represents a connection of a specific virtual machine.

17. A non-transitory machine-accessible storage medium that provides instructions, which when accessed, cause a machine to perform operations comprising:
representing a wireless station (STA) as a Group of Stations comprising a plurality of virtual stations to communicate with an access point (AP) in a managed wireless network;
sending by said AP first management frames to the plurality of virtual stations in said Group-of-Stations while communicating with one of the plurality of virtual stations in said Group-of-Stations;
using masking operations on a MAC address to define said Group of Stations, wherein said using masking operations on a MAC address comprises identifying the Group-of-Station's address by using N bits of a station MAC address and differentiating between Group-of-Station's addresses and regular MAC addresses by using M bits of Group-of-Station's addresses set to a specific mask; and using X bits of a MAC address that are in a specific place of a station MAC address to uniquely identify a particular station inside said Group-of-Stations.

18. The non-transitory machine-accessible storage medium of claim 17, further comprising said instructions causing said machine to perform operations further comprising communicating by said STA second management frames in compliance with an Institute for Electronic and Electrical Engineers standard 802.11 communication protocol to said AP, wherein said second management frames are used by said AP as if they were received from said plurality of virtual stations within said Group-of-Stations.

19. A system, comprising:
an access point (AP);
a wireless station (STA) operable to wirelessly communicate with said access point in a managed wireless network; and
wherein said STA is capable of communicating to said AP as a Group-of-Stations comprising a plurality of virtual stations, and wherein said AP is configured to communicate with said STA while sending first management frames to the plurality of virtual stations in said Group-of-Stations, wherein said Group-of-Stations is configured by using masking operations on a MAC address, wherein said using masking operations on a MAC address comprises N bits of a station MAC address to identify the Group-of-Station's address, and to differentiate between Group-of-Station's addresses and regular MAC addresses, M bits of Group-of-Station's addresses that are set to a specific mask; and X bits of a MAC address that are in a specific place of a station MAC address to uniquely identify a particular station inside a Group-of-Stations.

20. The system of claim 19, further comprising:
a dipole antenna connected to said AP.

21. The system of claim 19, wherein said STA communicates second management frames in compliance with an Institute for Electronic and Electrical Engineers standard 802.11 communication protocol to said AP and wherein said second management frames are used by said AP as if they were received from said plurality of virtual stations within said Group-of-Stations.

22. The system of claim 19, wherein the one of the plurality of virtual stations is defined as a "master station" to coordinate certain 802.11 operations on behalf of the plurality of virtual stations.

23. The system of claim 20, wherein said Group-of-stations is configured by adding an Information Element (IE) to an Association/Reassociation request.

24. The system of claim 23, wherein said IE contains ID that uniquely identifies the group-of-stations.

* * * * *

UNITED STATES PATENT AND TRADEMARK OFFICE
CERTIFICATE OF CORRECTION

Page 1 of 1

PATENT NO.         : 8,332,534 B2
APPLICATION NO.    : 11/495960
DATED              : December 11, 2012
INVENTOR(S)        : Izoslav et al.

It is certified that error appears in the above-identified patent and that said Letters Patent is hereby corrected as shown below:

In the Specification

In column 3, at line 51 delete, "(315, 320, 235" and insert -- (315, 320, 325 --.

In the Claims

In column 6, at line 10 delete, ": and" and insert -- ; and --.

Signed and Sealed this
Fourth Day of March, 2014

Michelle K. Lee
*Deputy Director of the United States Patent and Trademark Office*